Patented Mar. 27, 1923.

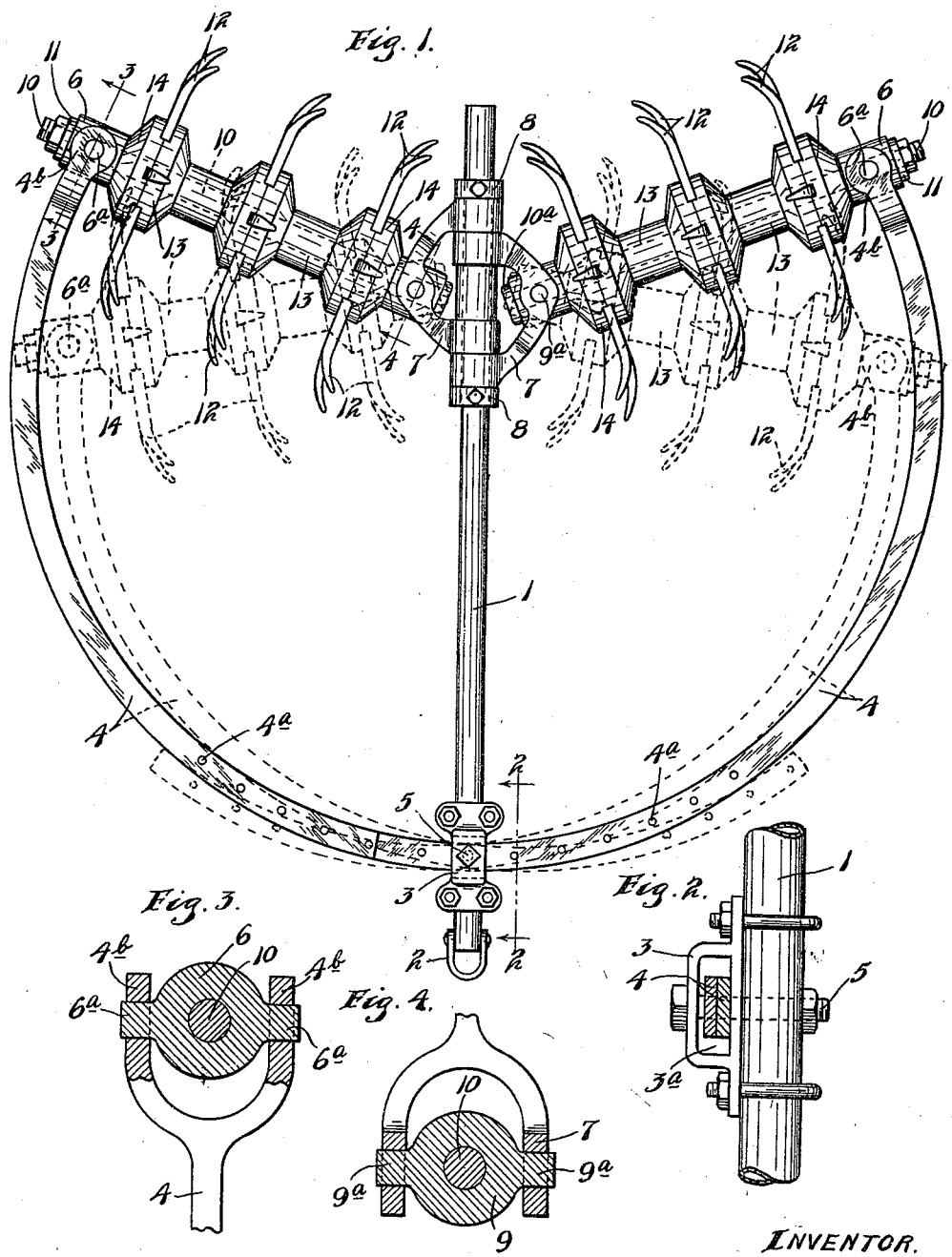

1,449,584

UNITED STATES PATENT OFFICE.

JOHN BUTLER, OF ECHO, MINNESOTA, ASSIGNOR OF ONE-HALF TO AUGUST J. HINZ, OF WOOD LAKE, MINNESOTA.

ROTARY GROUND PULVERIZER.

Application filed September 1, 1921. Serial No. 497,681.

*To all whom it may concern:*

Be it known that I, JOHN BUTLER, a citizen of the United States, residing at Echo, in the county of Yellow Medicine and State of Minnesota, have invented certain new and useful Improvements in Rotary Ground Pulverizers; and I do hereby declare the following to be a full, clear, and exact description of the invention, such as will enable others skilled in the art to which it appertains to make and use the same.

This invention relates to a rotary ground pulverizer, and while the invention has high efficiency when used on various kinds of agricultural ground, the device is especially designed for use on plowed ground containing a great many roots, such as quack grass roots. The device will also be found efficient for use on gravel or macadam roads for disintegrating the lumps as they are raised and distributed by the road plows.

It is an object of this invention to provide a pair of ground pulverizing elements rotating on substantially oppositely directed axes, which axes are capable of movement both vertically, and angularly in substantially a horizontal plane.

It is a further object to mount the ground pulverizing elements on a single central member which can be conveniently hitched to a tractor or team of horses.

These and other objects and advantages of the invention will be fully set forth in the following description made in connection with the accompanying drawings, in which—

Fig. 1 is a plan view of the device;

Fig. 2 is a section taken on the line 2—2 of Fig. 1, as indicated by the arrows;

Fig. 3 is a section taken on the line 3—3 of Fig. 1, as indicated by the arrows; and Fig. 4 is a section taken on the line 4—4 of Fig. 1.

Referring to the drawings, the device comprises a central member or shaft 1, to one end of which is attached an ordinary form of clevis 2 by which the device may be hitched to suitable tractor means, the member 1 being extended to any desired length. To the rear of the member 2 the member 1 has secured thereto a bracket 3 by spaced U-clips which pass through flanges at each end of the bracket and have clamping nuts applied thereto. The bracket has a yoke formation forming an aperture 3ª and the ends of curved or segmental members 4 are adapted to be loosely disposed in said opening in superposed relation and thereby held in fixed position by a headed and nutted bolt 5 which passes through the center of the bracket and through the central member 1. The members 4 are provided with a plurality of holes 4ª so that the same may be held in various adjusted positions, different positions of the members being shown in dotted lines in Fig. 1. The other ends of the members 4 are bifurcated and formed with apertured heads 4ᵇ in which are pivoted bearing members 6 on trunnions 6ª formed integral therewith. At some distance to the rear of the brackets 3 the member 1, which it may be stated, is illustrated as of iron pipe, has swingingly mounted thereon, oppositely directed yoke brackets 7 having sleeves encircling the member 1 and being held in place by collars fastened by suitable set screws. The central portions of the members 7 are formed as apertured lugs in which are pivoted bearing members 9 on trunnions 9ª formed integral therewith.

In the bearings 6 and 9 are rotatably mounted shafts 10 having enlarged heads 10ª at one end and threaded shoulders at their other ends on which retaining collars 11 are held in place thereon by suitable nuts applied to said ends. Mounted on the shafts 10 are spaced series of pulverizing devices comprising circumferentially arranged radial teeth 12 clamped in recesses formed in hub or sleeve members 13 and 14, which are held in assembled relation between the bearing members 6 and 9. The ends of the teeth 12 are curved inwardly at their outer ends toward the central member 1.

In operation, the device will be drawn along over the ground and the shafts 10 adjusted to the desired angle. The pulverizing members comprising the teeth 12 and hubs 13 and 14 will rotate and the lumps of earth will be disintegrated thereby. By means of the swinging of members 7 about member 1 and the pivots of the bearings 9 in the member 7, the shafts 10 can move not only vertically but can be swung to various angles by adjustment of the members 4. The vertical movement of the shafts 10 will allow the same to adapt themselves to any irregularities in the ground and to effectively operate on the lumps to be crushed or pulverized. Vertical movement is not only permitted by the swiveled inner ends of the shafts but owing to the loose disposition of the members 4 in brackets 3 considerable movement is also permitted at their outer ends.

The present device has been found to have great efficiency in treating newly plowed ground where there is a large quantity of rough or obstructing material, such as roots, and particularly roots as those of thistle and quack grass. The members 13 revolve and the teeth 12 constantly pierce the ground, and owing to their curved outer ends, tear loose the quack grass and other roots and lift the same to the top of the ground where they are dropped. The ground is thus cleared of such roots, and the latter can be either allowed to dry or be raked up after the ground has been treated. The capacity of the shafts 10, and the ground piercing devices for vertical movement allows the same to pass over any large stones or similar obstructions which may be encountered.

From the above description it is seen that applicant has provided a simple, rugged and efficient pulverizing device and one that can be easily and inexpensively made. When once assembled, the parts are securely held in place and will require little attention for maintenance.

It will, of course, be understood that various changes may be made in the form, details and arrangement of the device without departing from the scope of applicant's invention, which, generally stated, consists in the matter shown and described and set forth in the appended claims.

What is claimed is:

1. A ground disintegrating and root picking device having in combination, a central longitudinal member, bearings swiveled thereto, shafts journaled at one end in said bearings and carrying rotary ground piercing devices, and means for supporting the other ends of said shafts from the central member for angular adjustment in a substantially horizontal plane.

2. A rotary ground pulverizer and grass root picker having in combination, a central shaft, bearings swiveled thereto at each side thereof adjacent one end, oppositely extending shafts rotatably mounted in said bearings and carrying ground piercing devices, bearings supporting the other ends of said shafts, and segmental brackets adjustably secured to said central member to which said last named bearings are pivoted.

3. A ground pulverizing device having in combination, a central longitudinal member forming a draft means, curved brackets adjustably secured to said member and extending at opposite sides thereof in a substantially continuous curve, bearings pivoted to the ends of said brackets, shafts journaled in said bearings and extending toward the central member, ground piercing devices mounted on said shafts, and means for supporting the other ends of said shafts from the central member for vertical movement.

4. A ground pulverizing and quack grass root picking device having in combination, a central longitudinal member, a pair of rotary ground picking devices comprising spaced series of circumferentially spaced radial teeth, said pulverizing device being swiveled at their inner ends to said central member and being pivoted at their outer ends to curved segmental brackets which are loosely and adjustably secured to the said central member.

5. A ground pulverizing device having in combination, a central longitudinal draft member, a bracket secured thereto, curved segmental members extending at each side of said central member and loosely disposed in overlapping relation in said bracket, each of said members having therein a plurality of holes, a securing member adapted to pass through said bracket, and a pair of said holes in alined position to hold said members in adjusted relation, said members having bearings pivoted at their other ends, rotary shafts journaled in said bearings, and carrying ground pulverizing devices, said shafts extending toward said central member and supported at their other ends in bearings swiveled thereto.

6. A ground pulverizing and quack grass root picking machine having in combination a series of rotary ground piercing devices co-axially disposed along a longitudinal axis, and means for mounting said axis with freedom for swinging movement in a vertical plane and for angular adjustment in a horizontal plane.

In testimony whereof I affix my signature.

JOHN BUTLER.

Witnesses:
H. H. SOMMERFELD,
F. W. SOMMERFELD.